US009898568B2

(12) United States Patent
Srivastava et al.

(10) Patent No.: US 9,898,568 B2
(45) Date of Patent: Feb. 20, 2018

(54) REDUCING THE LOAD ON THE BITLINES OF A ROM BITCELL ARRAY

(71) Applicant: Advanced Micro Devices, Inc., Sunnyvale, CA (US)

(72) Inventors: Naveen Chandra Srivastava, Kanpur (IN); Janardhan Achanta, Kakinada (IN); Pankaj Kumar, Hardoi (IN); Shreekanth Karandoor Sampigethaya, Kannamangala (IN)

(73) Assignee: Advanced Micro Devices, Inc., Sunnyvale, CA (US)

(*) Notice: Subject to any disclaimer, the term of this patent is extended or adjusted under 35 U.S.C. 154(b) by 182 days.

(21) Appl. No.: 14/748,075

(22) Filed: Jun. 23, 2015

(65) Prior Publication Data
US 2016/0378898 A1   Dec. 29, 2016

(51) Int. Cl.
*G06F 17/50* (2006.01)
(52) U.S. Cl.
CPC ............................... *G06F 17/5068* (2013.01)
(58) Field of Classification Search
CPC .................................................. G06F 17/5068
See application file for complete search history.

(56) References Cited

U.S. PATENT DOCUMENTS

| 4,208,726 | A  |   | 6/1980  | McElroy          |
|-----------|----|---|---------|------------------|
| 5,917,224 | A  |   | 6/1999  | Zangara          |
| 6,618,282 | B1 |   | 9/2003  | Poplevine et al. |
| 6,826,070 | B2 |   | 11/2004 | Sung et al.      |
| 7,009,880 | B1 |   | 3/2006  | Liu              |
| 8,134,870 | B2 |   | 3/2012  | Alami et al.     |
| 2004/0033670 | A1 |   | 2/2004 | Yang et al.      |
| 2012/0163064 | A1 | * | 6/2012 | Jain ........................ G11C 17/12 365/104 |

* cited by examiner

*Primary Examiner* — Vuthe Siek
(74) *Attorney, Agent, or Firm* — Rory D. Rankin; Meyertons, Hood, Kivlin, Kowert & Goetzel, P.C.

(57) ABSTRACT

Systems, apparatuses, and methods for reducing the load on the bitlines of a ROM bitcell array are described. The connections between nets of a ROM bitcell array may be assigned based on their programmed values using a traditional approach. Then, a plurality of optimizations may be performed on the assignment of nets to reduce the load on the bitlines of the array. A first optimization may swap the connections between ground and bitline for the nets of a given column responsive to detecting that the number of connections to the corresponding bitline is greater than the number of connections to ground for the given column. A second optimization may remove the connection of a net to a bitline if three consecutive nets of a given column are connected to the bitline.

15 Claims, 16 Drawing Sheets

*Programmed '0' Bitcell*

REDUCING THE LOAD ON THE BITLINES OF A ROM BITCELL ARRAY

BACKGROUND

Technical Field

Embodiments described herein relate to the field of integrated circuit design and more particularly, to methods for reducing the load on the bitlines of a ROM bitcell array.

Description of the Related Art

The semiconductor industry aims to manufacture integrated circuits with higher and higher densities of semiconductor devices on a smaller chip area to achieve greater functionality and to reduce manufacturing costs. This desire for large scale integration has led to a continued shrinking of circuit dimensions and device features. However, as technological advances enable smaller integrated circuit features, spacing between devices and layers is reduced, thereby increasing capacitance. The increased capacitance results in degraded performance, increased current leakage, and decreased reliability. The impact will be more significant if there is a large load on a long running wire.

In view of the above, methods and mechanisms for reducing the load on integrated circuit wires are desired.

SUMMARY

Systems, apparatuses, and methods for reducing the load on bitlines in memory cell array are contemplated.

Embodiments of an apparatus configured to perform optimizations of memory cell arrays are contemplated. In various embodiments, the array is a Read Only Memory (ROM) bitcell array. In one embodiment, the apparatus corresponds to a tool that is configured to analyze the initial layout of a ROM bitcell array to detect one or more conditions for optimizing the layout of the array. Such a tool may be, for example, a design tool or ROM bitcell programming tool. If a first condition is detected, a first optimization step may be performed to reduce the load on the bitlines of the ROM bitcell array. In one embodiment, first condition may comprise determining that the number of nets connected to a bitline is greater than the number of nets connected to ground for a given column of the ROM bitcell array. In such an embodiment, the design tool may analyze each column of the ROM bitcell array to determine if the first condition is detected for the column. In various embodiments, the first optimization step may comprise swapping connections between the bitline and ground for the given column. The first optimization may be performed for each column of the ROM bitcell array for which the first condition is detected.

In various embodiments, the design tool may also determine if a second condition is detected for the initial layout of the ROM bitcell array. In one embodiment, the second condition may comprise detecting three consecutive nets of a given column connected to a corresponding bitline. In another embodiment, the second condition may comprise detecting that two nets at a start or an end of a given column are connected to a corresponding bitline. In these embodiments, the design tool may analyze each column of the ROM bitcell array to determine if the second condition is detected for any of the columns of the array.

If the second condition is detected for any of the columns of the ROM bitcell array, then the design tool may perform a second optimization step. In one embodiment, the second optimization step may comprise removing at least one connection to the bitline for the three consecutive nets of the given column. In another embodiment, the second optimization step may comprise removing a connection to the bitline for a net at the start or end of the given column. When the connection to the bitline is removed for a given net, the given net may be left floating or shorted with the other leg of the same bitcell if the other leg is also floating. In further embodiments, other optimization steps may also be performed on the initial layout of the ROM bitcell array. The layout of the ROM bitcell array may then be finalized using the one or more optimization steps applied to the initial layout.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
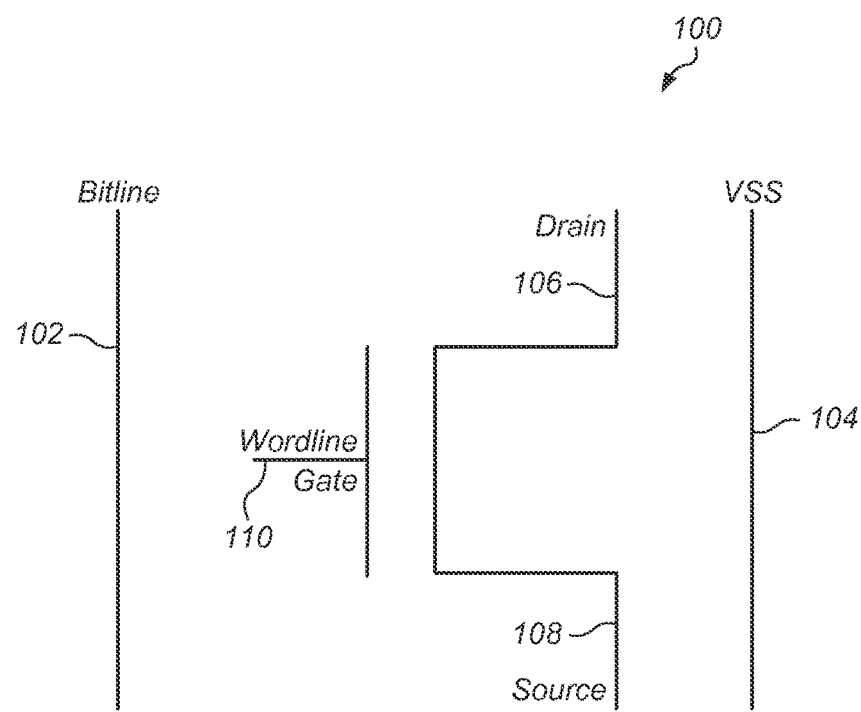
FIG. 1 is a diagram illustrating one embodiment of a base read-only memory (ROM) bitcell.

Referring now to FIG. 1, a diagram of one embodiment of a base read-only memory (ROM) bitcell 100 is shown. It is noted that while the following uses a ROM type memory cell for purposes of discussion, those skilled in the art will appreciate that the methods and mechanisms described herein may be applied to other memory cells and circuit types. In the example shown, bitcell 100 may be configured to store a single bit. In one embodiment, bitcell 100 may be a single n-channel Mosfet (NMOS) transistor. The gate 110 of bitcell 100 may be connected to a wordline (e.g., corresponding to a row in an array of cells). The two terminals (drain 106 and source 108) are shown as floating but can be connected to bitline 102 (e.g., corresponding to a column in an array of cells) or VSS 104 (ground), depending on the data value (0 or 1) which is programmed to bitcell 100. It is noted that bitcell 100 is intended to represent a bitcell in accordance with one embodiment. Other types of bitcells and transistor technologies may be utilized in other embodiments.

Figure 2:
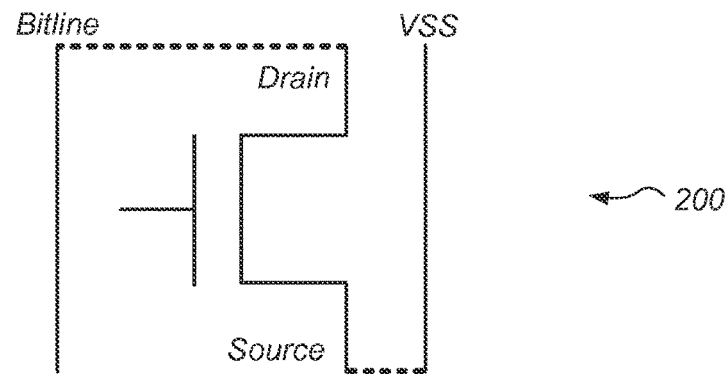
FIG. 2 illustrates two diagrams of ROM bitcells programmed with a value of '0'.
Figure 2:
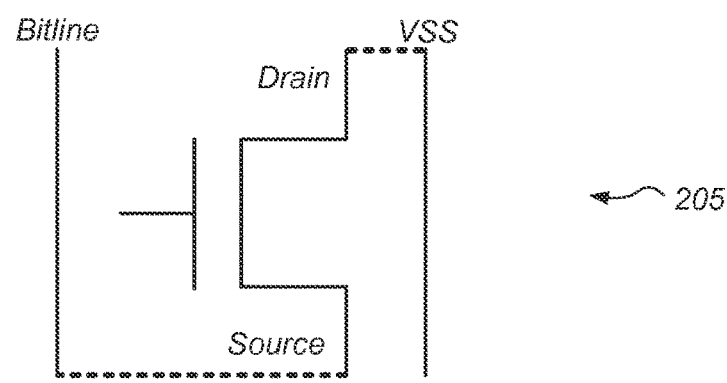

Turning now to FIG. 2, two diagrams illustrating bitcells programmed with a value of '0' are shown. In the top diagram 200, the drain is connected to the bitline while the source is connected to VSS. In the bottom diagram 205, the drain is connected to VSS while the source is connected to the bitline. Either approach may be used to program the bitcell to a value of '0'.

Figure 3:
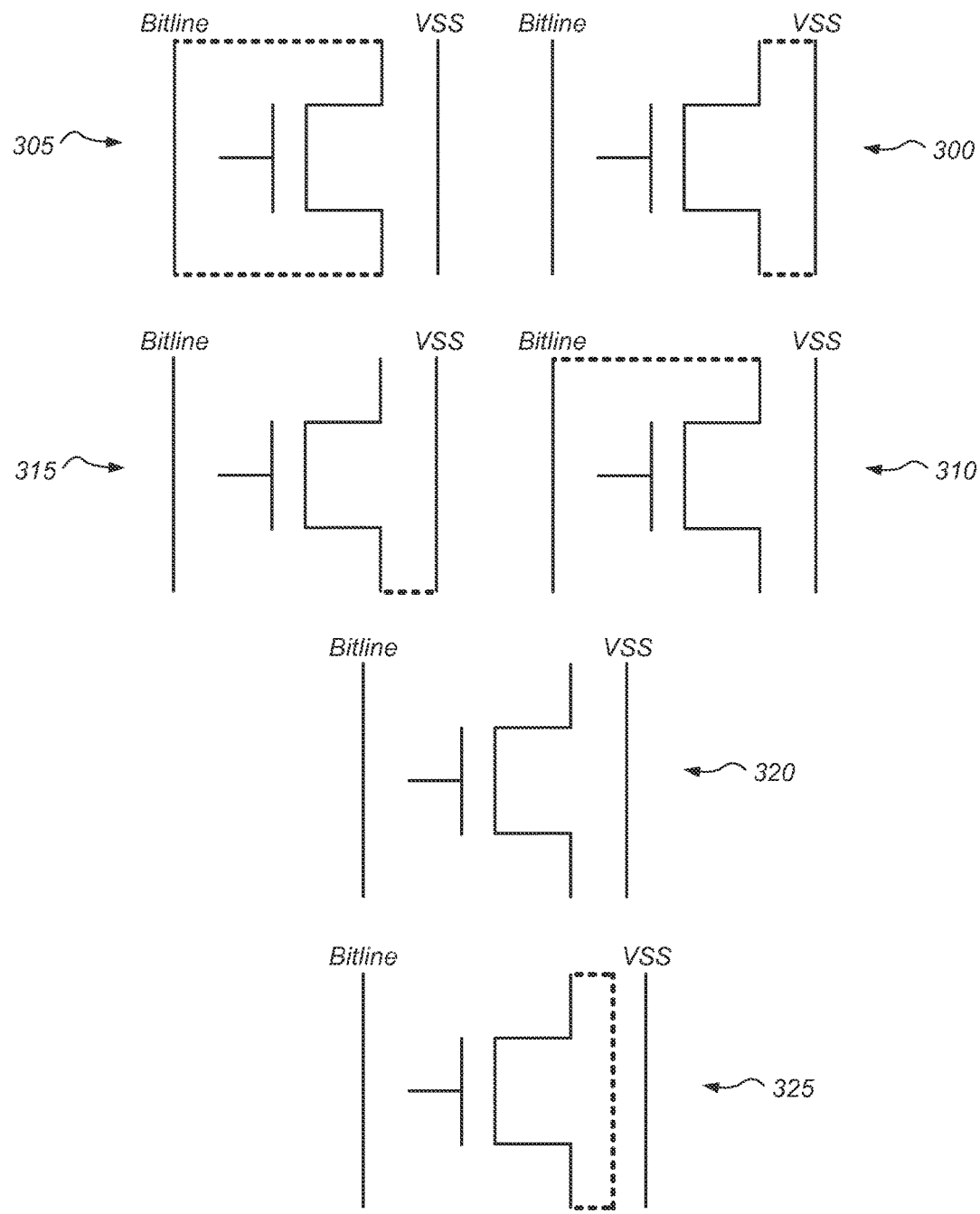
FIG. 3 illustrates multiple diagrams illustrating ROM bitcells programmed with a value of '1'.

Referring now to FIG. 3, diagrams illustrating bitcells programmed with a value of '1' are shown. Various connections may be utilized to program a bitcell with a value of '1'. For example, both terminals (drain and source) may be connected to VSS to program the bitcell with a value of '1' as shown in diagram 300. Also, both the drain and the source may be connected to the bitline as shown in diagram 305 to program the bitcell with a value of '1'. Alternatively, one terminal (drain or source) may be connected to the bitline and the other may be floating to program the bitcell with a value of '1' as shown in diagram 310. Still further, one terminal may be connected to VSS and the other may be floating to program the bitcell with a value of '1' as shown in diagram 315. Additionally, both terminals may be floating as shown in diagram 320 to program the bitcell with a value of '1'. Still further, the drain and source may be connected together as shown in diagram 325 to program the bitcell with a value of '1'. Additional ways of connecting a bitcell in order to program the bitcell with a value of '1' may also be utilized.

It should be understood that the value designations shown in FIGS. 2 and 3 may be reversed in another embodiment. For example, in another embodiment, the value of '1' may be programmed using the connections shown in FIG. 2 while the value of '0' may be programmed using the connections shown in FIG. 3. Generally speaking, the diagrams shown in FIG. 2 may be utilized to store a first type of information (e.g., a binary value of '0') and the diagrams shown in FIG. 3 may be utilized to store a second type of information (e.g., a binary value of '1').

Figure 4:
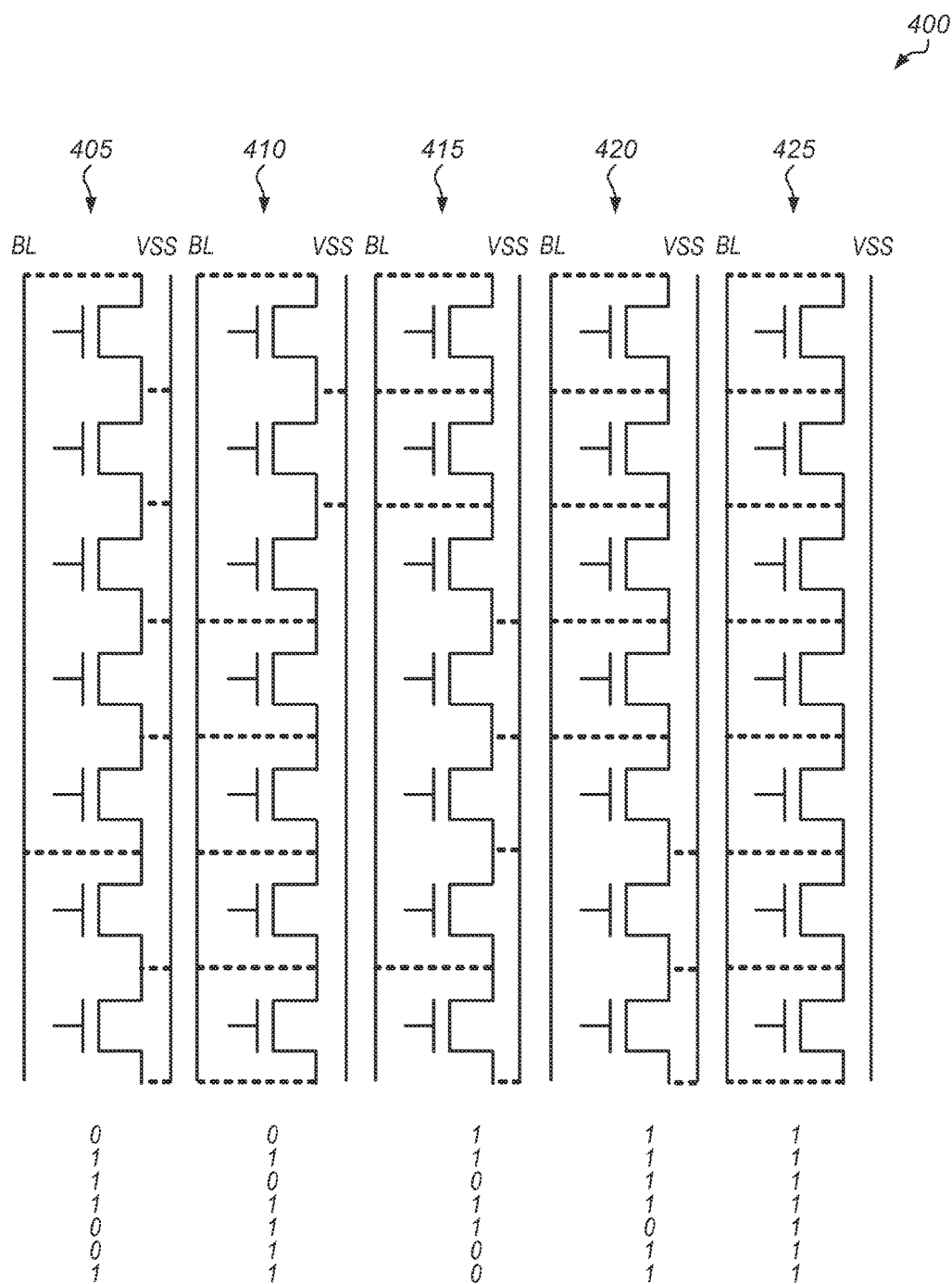
FIG. 4 is a diagram of one embodiment of programming a ROM bitcell array.

Turning now to FIG. 4, a diagram of one embodiment of programming a ROM bitcell array 400 is shown. The values used for programming the ROM bitcell array 400 are shown at the bottom of FIG. 4. Accordingly, the first (leftmost) column 405 of ROM bitcell array 400 may be programmed to store "0111001", the second column 410 may be programmed to store "0101111", the third column 415 may be programmed to store "1101100", the fourth column 420 may be programmed to store "1111011", and the fifth column 425 may be programmed to store "1111111". These values are merely intended to represent one possible set of values which may be used to program a ROM bitcell array 400. ROM bitcell array 400 is one example of how the nets (i.e., drains and sources) of individual bitcells may be connected in one embodiment using a traditional programming approach.

Figure 5:
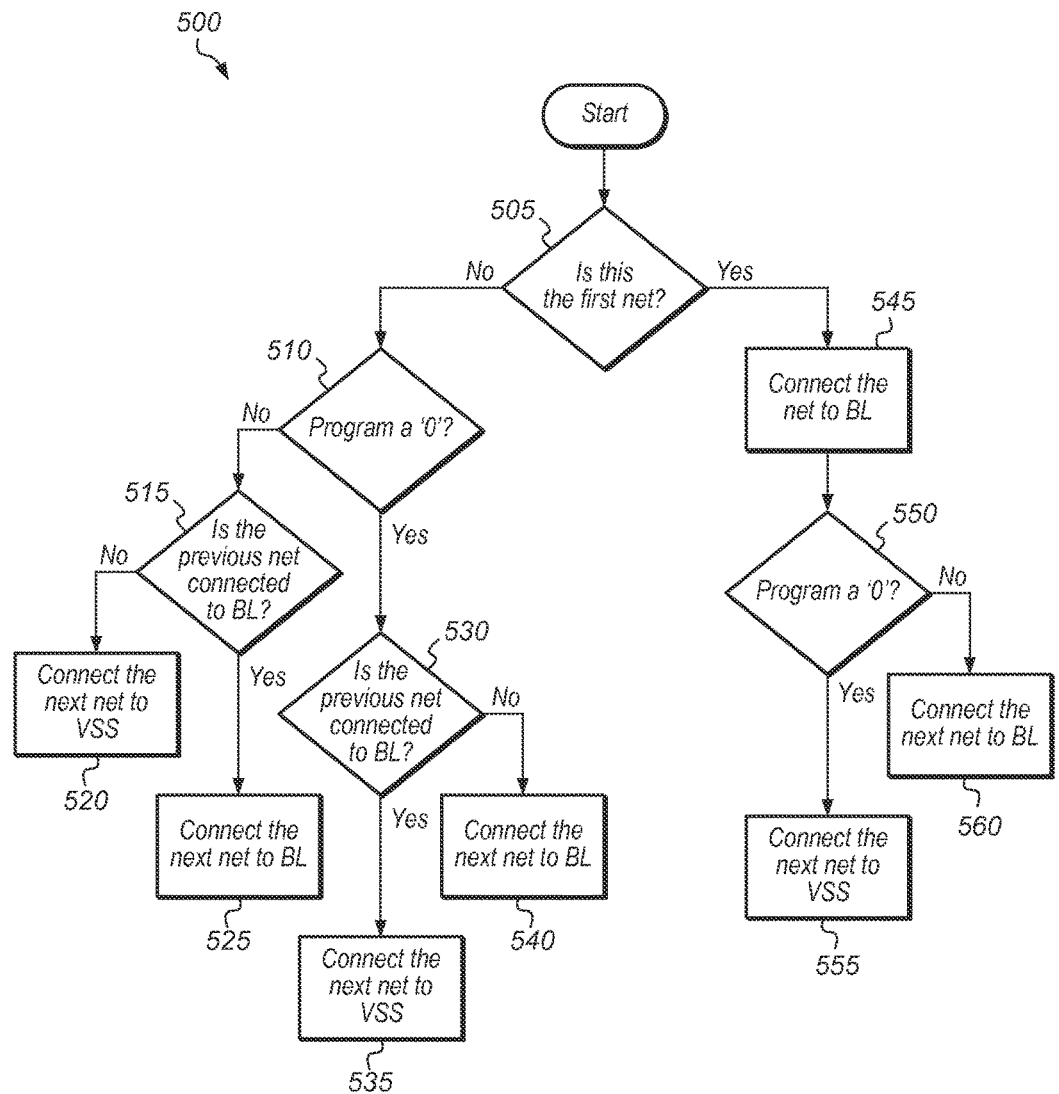
FIG. 5 is a generalized flow diagram illustrating one embodiment of a prior art method for determining how to program a ROM bitcell array.

Referring now to FIG. 5, one embodiment of a prior art method 500 for determining how to program a bitcell array is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, and/or systems described herein may be configured to implement method 500.

Method 500 may start by determining if the current net being processed is the first net of the bitcell array column (conditional block 505). If the current net is not the first net of the bitcell array column (conditional block 505, "no" leg), then the tool may determine if the bitcell is assigned to be programmed as a '0' (conditional block 510). If the bitcell is assigned to be programmed as a '1' (conditional block 510, "no" leg), then the tool may determine if the previous net is connected to the bitline (BL) (conditional block 515). If the previous net is not connected to the bitline (conditional block 515, "no" leg), then the tool may connect the next net to VSS (block 520). If the previous net is connected to the bitline (conditional block 515, "yes" leg), then the tool may connect the next net to the bitline (block 525).

If the bitcell is assigned to be programmed as a '0' (conditional block 510, "yes" leg), then the tool may determine if the previous net is connected to the bitline (conditional block 530). If the previous net is connected to the bitline (conditional block 530, "yes" leg), then the tool may connect the next net to VSS (block 535). If the previous net is not connected to the bitline (conditional block 530, "no" leg), then the tool may connect the next net to the bitline (block 540).

If this net is the first net of the bitcell array column (conditional block 505, "yes" leg), then the tool may connect the net to the bitline (block 545). Next, the tool may determine if the bitcell is assigned to be programmed as a '0' (conditional block 550). If the bitcell is assigned to be programmed as a '0' (conditional block 550, "yes" leg), then the tool may connect the next net to VSS (block 555). If the bitcell is assigned to be programmed as a '1' (conditional block 550, "no" leg), then the tool may connect the next net to the bitline (block 560). It is noted that method 500 may be repeated for each net of the ROM bitcell array. It is also noted that method 500 may be utilized to connect the nets of ROM bitcell array 400 of FIG. 4 according to the programmed values shown at the bottom of FIG. 4. It should be understood that there are many other different prior art approaches to programming a bitcell array, and that method 500 is merely one example of an approach to programming a bitcell array.

Figure 6:
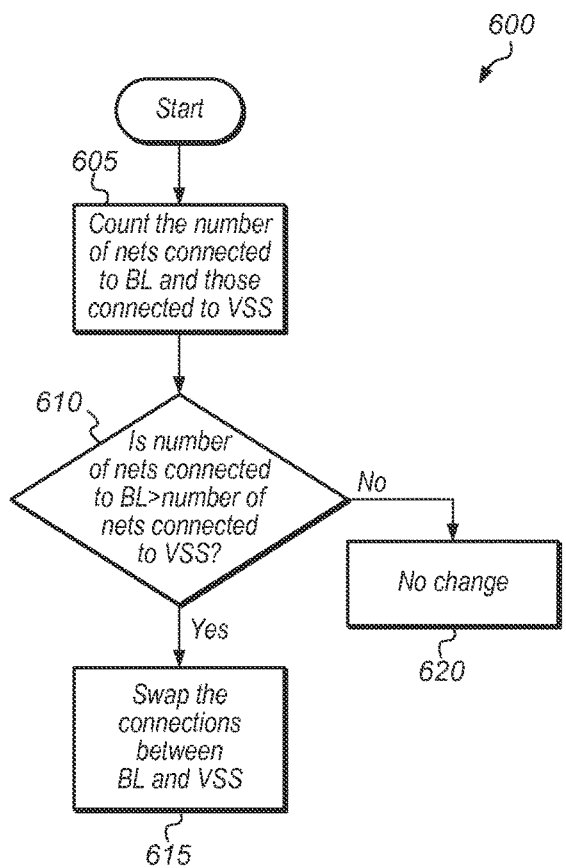
FIG. 6 is a generalized flow diagram illustrating one embodiment of a method for performing a first optimization to reduce the load on the bitlines of a ROM bitcell array.

Referring now to FIG. 6, one embodiment of a method 600 for performing a first optimization to reduce the load on the bitlines of a ROM bitcell array is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various apparatuses and/or systems described herein may be configured to implement method 600.

In various embodiments, the number of nets connected to the bitline (BL) and the number of nets connected to VSS for each column of the ROM bitcell array (block 605). For example, an apparatus such as a design tool, or ROM programming tool, may be used to count the number of nets. In one embodiment, the design tool may be a software tool executing on a computer system such as a desktop computer, workstation, cloud, or other computing device. Other design tools may have hardware specifically designed for performing design tasks. Any of a variety of hardware and/or software components are possible and are contemplated. The computer system may include one or more processors, memory devices, input/output devices, internal buses, communication interfaces, display devices, and/or other devices. If the number of nets connected to the bitline is greater than the number of nets connected to VSS for a given column (conditional block 610, "yes" leg), then the design tool may swap the connections between the bitline and VSS for the given column (block 615). If the number of nets connected to the bitline is less than or equal to the number of nets connected to VSS for a given column (conditional block 610, "no" leg), then no change may be made for the given column (block 620).

Figure 7:
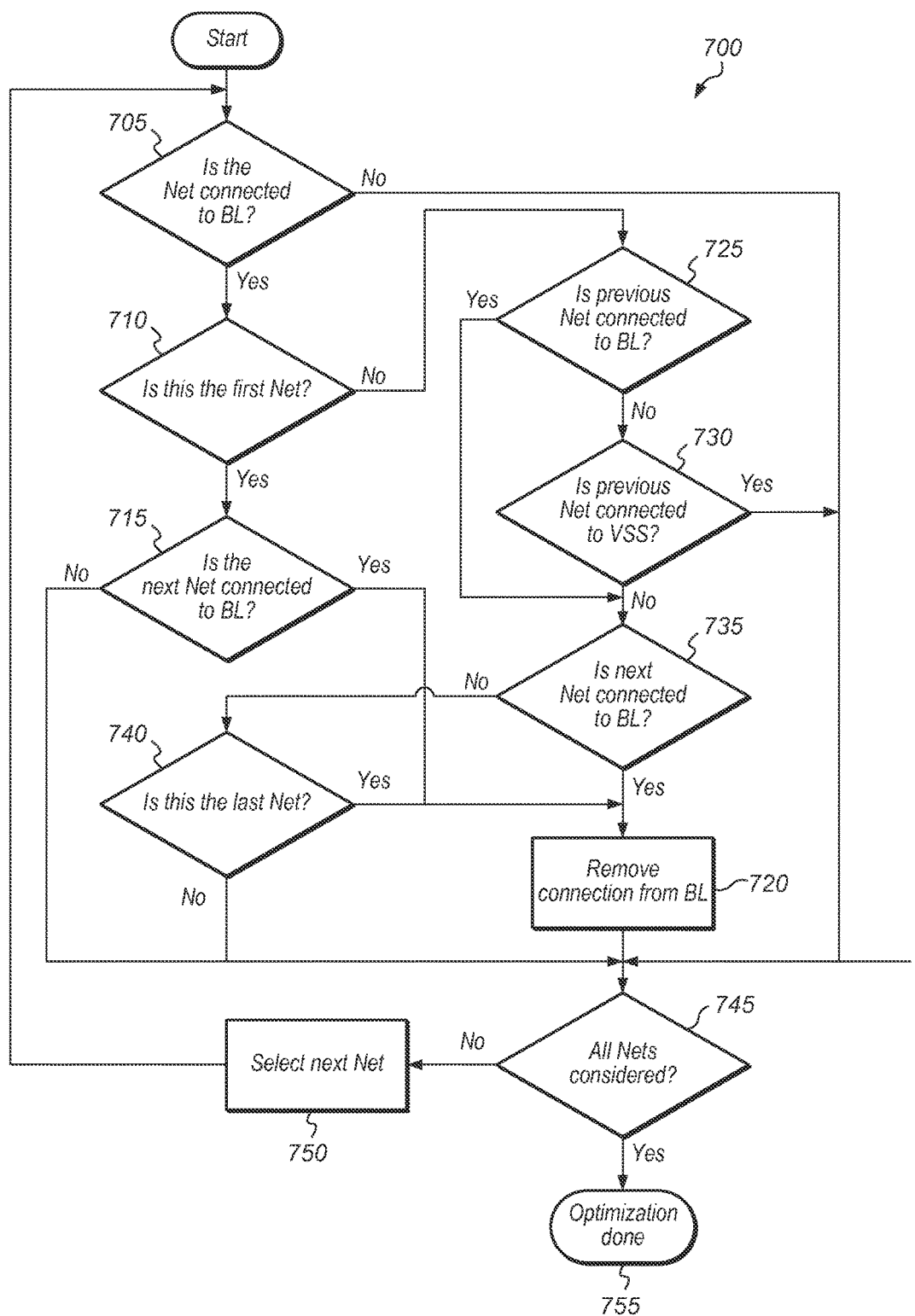
FIG. 7 is a generalized flow diagram illustrating one embodiment of a method for performing a second optimization to reduce the load on the bitlines of a ROM bitcell array.

Referring now to FIG. 7, one embodiment of a method 700 for performing a second optimization to reduce the load on the bitlines of a ROM bitcell array is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various apparatuses and/or systems described herein may be configured to implement method 700.

Method 700 may start with a design tool, for example, determining if the net is connected to the bitline (BL) (conditional block 705). If the net is connected to the bitline (conditional block 705, "yes" leg), then the design tool may determine if this is the first net of a given column of the ROM bitcell array (conditional block 710). If the net is not connected to the bitline (conditional block 705, "no" leg), then the design tool may determine if all nets of the array have been considered for optimization (conditional block 745). If all nets have been considered for optimization (conditional block 745, "yes" leg), then the optimization may be done (block 755). If there are one or more nets of the array that have not yet been considered for optimization (conditional block 745, "no" leg), then another net may be selected for optimization (block 750). In block 750, the design tool may select the next net in the same column of the ROM bitcell array, or the design tool may select a net in another column of the array. After block 750, method 700 may return to block 705 to determine if the selected net is connected to the bitline.

If this is the first net (conditional block 710, "yes" leg), then the design tool may determine if the next net is connected to the bitline according to the original assignment of nets (conditional block 715). If the next net is connected to the bitline (conditional block 715, "yes" leg), then the design tool may remove the connection from the bitline (block 720). If the next net is not connected to the bitline (conditional block 715, "no" leg), then the design tool may determine if all nets of the array have been considered for optimization (conditional block 745).

If this is not the first net (conditional block 710, "no" leg), then the design tool may determine if the previous net is connected to the bitline according to the original assignment of nets (conditional block 725). If the previous net is connected to the bitline (conditional block 725, "yes" leg), then the design tool may determine if the next net is connected to the bitline according to the original assignment of nets (conditional block 735). If the previous net is not connected to the bitline (conditional block 725, "no" leg), then the design tool may determine if the previous net is connected to VSS according to the original assignment of nets (conditional block 730). If the previous net is connected to VSS (conditional block 730, "yes" leg), then the design tool may determine if all nets of the array have been considered for optimization (conditional block 745). If the previous net is not connected to VSS (conditional block 730, "no" leg), then the design tool may determine if the next net is connected to the bitline according to the original assignment of nets (conditional block 735). If the next net is connected to the bitline (conditional block 735, "yes" leg), then the design tool may remove the connection from the bitline (block 720). If the next net is not connected to the bitline (conditional block 735, "no" leg), then the design tool may determine if this is the last net of the given column of the ROM bitcell array (conditional block 740).

If this is the last net (conditional block 740, "yes" leg), then the design tool may remove the connection from the bitline (block 720). If this is not the last net (conditional block 740, "no" leg), then the design tool may determine if all nets of the array have been considered for optimization (conditional block 745). In one embodiment, method 700 may be performed by a design tool after method 600 (of FIG. 6) has been performed. Alternatively, method 700 may be performed by the design tool without method 600 being performed. In some embodiments, multiple instances of method 700 may be performed in parallel for a plurality of nets. For example, a software program may execute a plurality of threads simultaneously, and each thread of the plurality of threads may execute method 700 for a different net of the bitcell array.

Figure 8:
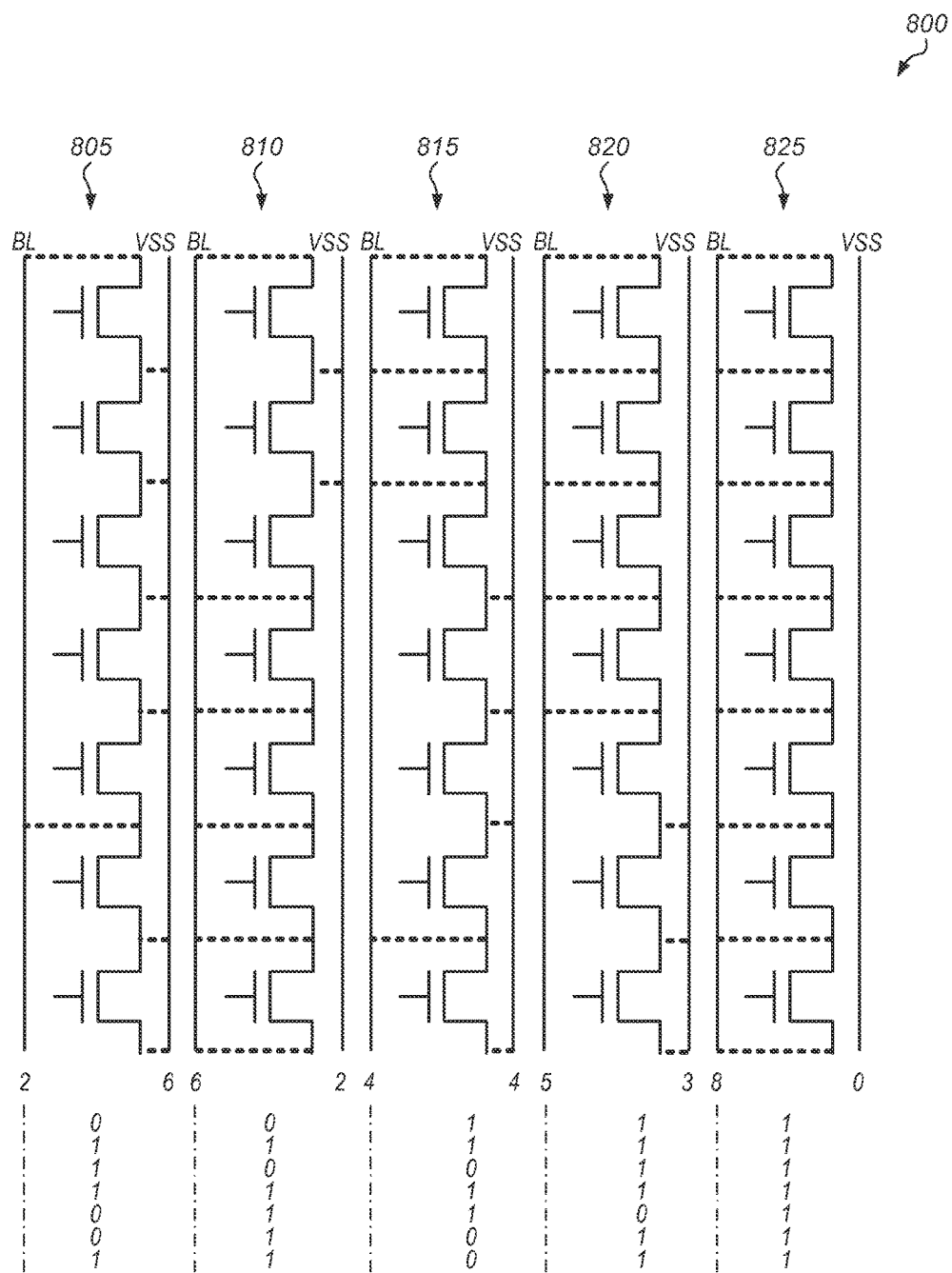
FIG. 8 is a diagram of one embodiment of a ROM bitcell array.

Turning now to FIG. 8, a diagram of one embodiment of a ROM bitcell array 800 is shown. ROM bitcell array 800 illustrates an example of the current approach to connecting nets of the individual bitcells based on the values assigned to the bitcells as shown at the bottom of each column of ROM bitcell array 800. A design tool may make an initial pass through ROM bitcell array 800 and connect the nets as shown in FIG. 8 according to the values assigned to the bitcells.

ROM bitcell array 800 is identical to ROM bitcell array 400 of FIG. 4. However, there is additional information shown at the bottom of FIG. 8 to illustrate the optimization techniques which may be utilized to reduce the load on the bitlines of ROM bitcell array 800. At the bottom of each column, the number of nets connected to bitline and VSS is shown next to the corresponding bitline and VSS.

For example, column 805 has two nets connected to the bitline and six nets connected to VSS, column 810 has six nets connected to the bitline and two nets connected to VSS, column 815 has four nets connected to the bitline and four nets connected to VSS, column 820 has five nets connected to the bitline and three nets connected to VSS, and column 825 has eight nets connected to the bitline and zero nets connected to VSS.

ROM bitcell array 800 will be used as an example for illustrating how the optimizations described in FIGS. 6 and 7 may be utilized to reduce the load on the bitlines of array 800.

Figure 9:
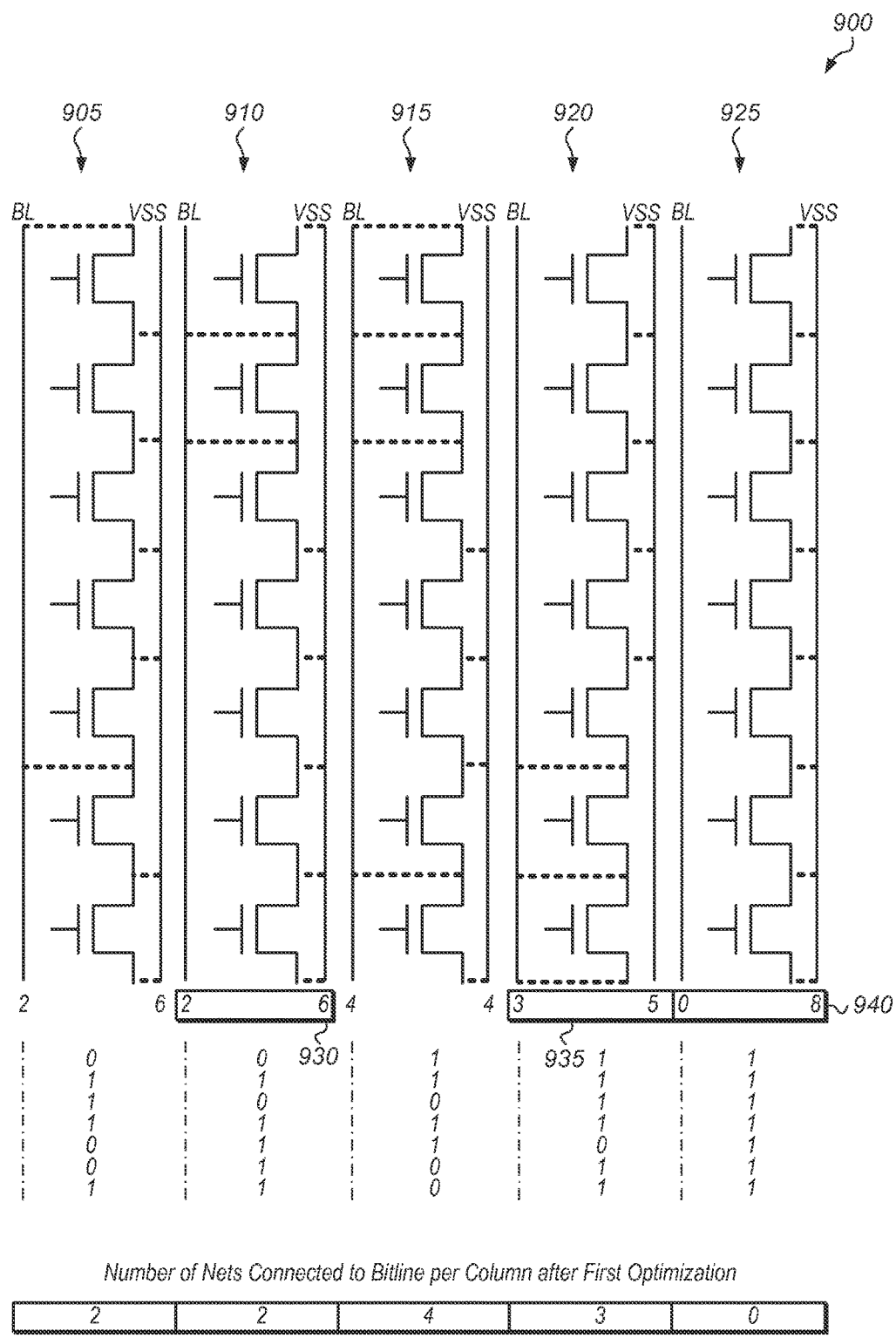
FIG. 9 is a diagram of one embodiment of a ROM bitcell array.

Referring now to FIG. 9, a diagram of one embodiment of a ROM bitcell array 900 is shown. ROM bitcell array 900 is meant to represent ROM bitcell array 800 (of FIG. 8) after the optimization described in FIG. 6 has been performed to reduce the number of connections to the bitlines of the array. The boxes 930, 935, and 940 at the bottom of columns 910, 920, and 925, respectively, illustrate the reduction of the number of connections to the bitlines that was achieved in response to using method 600 of FIG. 6.

In one embodiment, method 600 may be utilized to determine if reductions in the number of connections to the bitlines of ROM bitcell array 900 may be achieved. For columns 905 and 915, the number of nets connected to VSS is greater than or equal to the number of nets connected to the bitline, so no changes have been made to these columns. However, for columns 910, 920, and 925, the number of nets connected to the bitline is greater than the number of nets connected to VSS, and so the connections have been swapped for the nets of these columns. In other words, swapping the connections comprises reassigning a net to the bitline if it was previously assigned to VSS and reassigning a net to VSS if it was previously assigned to the bitline. The changes in the number of nets connected to the bitline and VSS are illustrated in boxes 930, 935, and 940 for columns 910, 920, and 925, respectively.

For example, by swapping the connections to the bitline with the connections to VSS for column 910, the connections to the bitline were reduced from six to two. For column 920, the connections to the bitline were reduced from five to three by swapping the connections to the bitline with the connections to VSS. For column 925, the connections to the bitline were reduced from eight to zero, as all previous connections from sources and drains to the bitline were replaced with connections to VSS. This is possible for column 925 because all of the bitcells are programmed with a value of '1', and this can be achieved by connecting both the source and drain of each bitcell to VSS.

Figure 10:
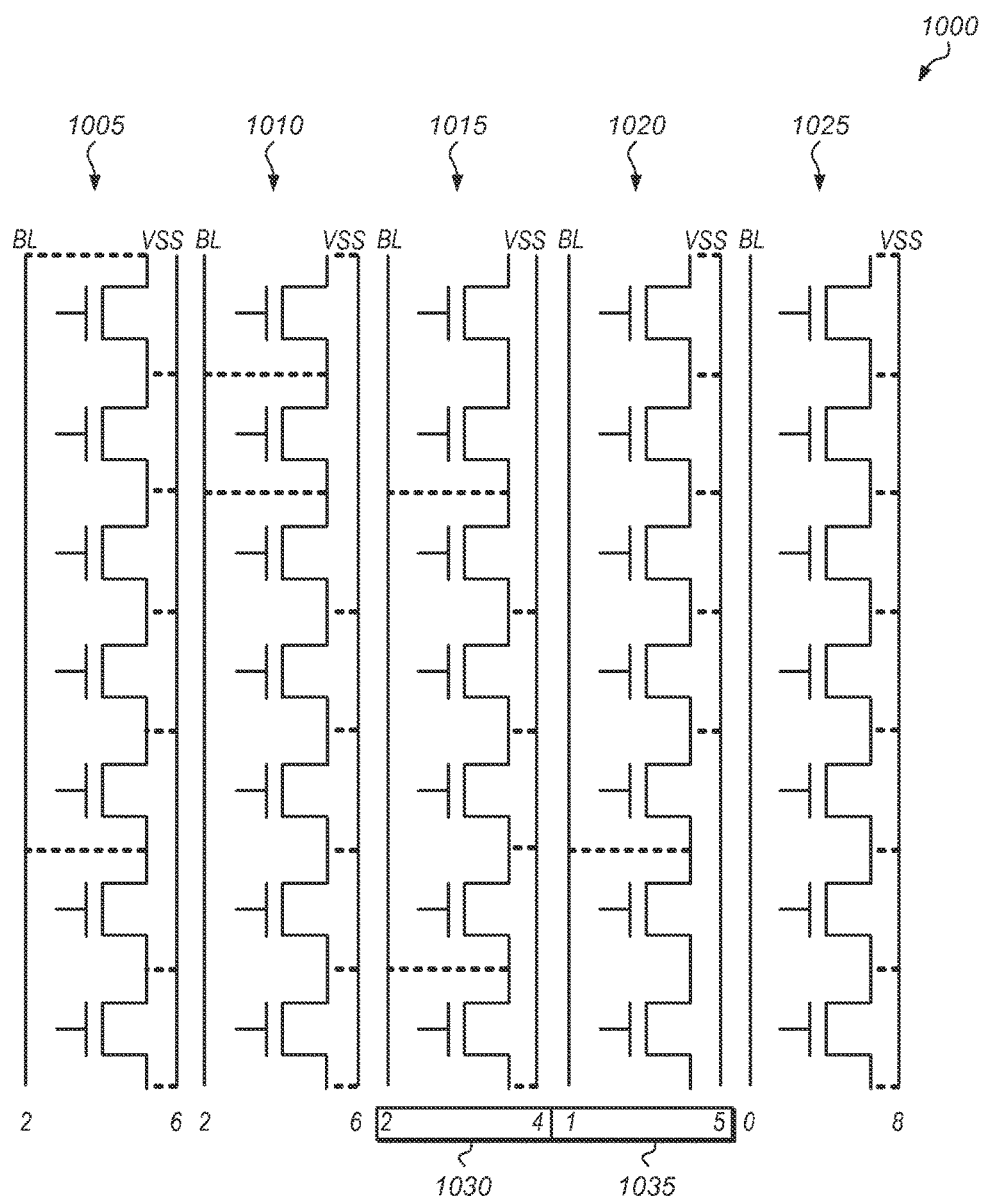
FIG. 10 is a diagram of one embodiment of a ROM bitcell array.

Turning now to FIG. 10, a diagram of one embodiment of a ROM bitcell array 1000 is shown. ROM bitcell array 1000 is meant to represent ROM bitcell array 900 (of FIG. 9) after the optimization described in FIG. 7 has been utilized to reduce the number of connections to the bitlines of the array. The boxes 1030 and 1035 at the bottom of columns 1015 and 1020, respectively, illustrate the reduction of the number of bitline connections that was achieved using method 700 of FIG. 7.

As shown in FIG. 10, the number of nets connected to the bitline in column 1015 was reduced from four to two using the optimization techniques described in method 700 of FIG. 7. It is noted that this reduction was achieved while still maintaining the same programmed values on each of the bitcells of column 1015 of ROM bitcell array 1000. Whereas the previous assignment of net connections had three consecutive nets connected to the bitline at the top of column 1015, after the reassignment, the top two nets of column 1015 are left floating (i.e., unconnected or open). Alternatively, in another embodiment, the top two nets of column 1015 may be shorted together after the reassignment. Also, the number of nets connected to the bitline in column 1020 was reduced from three to one using the optimization techniques described in method 700 of FIG. 7. The previous assignment of nets had three consecutive nets connected to the bitline at the bottom of column 1020, but after the optimization, the bottom two nets of column 1020 are left floating.

Figure 11:
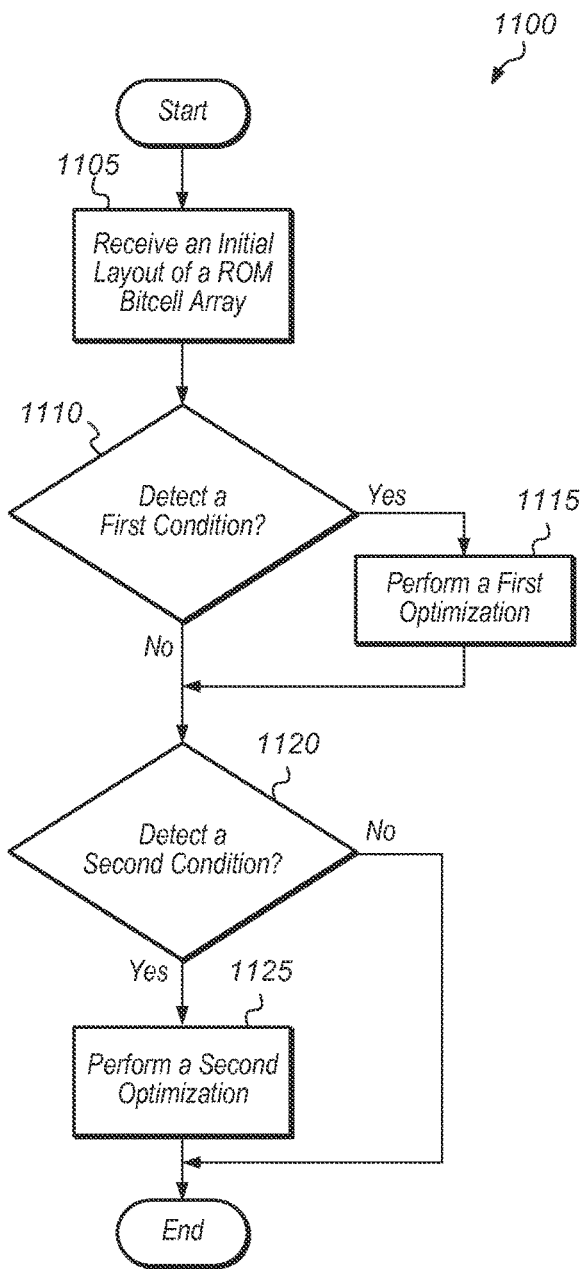
FIG. 11 is a generalized flow diagram illustrating one embodiment of a method for reducing the load on the bitlines of a ROM bitcell array.

Referring now to FIG. 11, one embodiment of a method 1100 for reducing the load on the bitlines of a ROM bitcell array is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the apparatuses and/or systems described herein may be configured to implement method 1100.

A design tool may receive an initial layout of a ROM bitcell array (block 1105). In one embodiment, the design tool may be software and/or hardware executing on an apparatus. The apparatus may include at least one or more processors coupled to one or more memory devices. In another embodiment, the design tool may be software and/or hardware executing on a system. The system may include at least one or more processors coupled to one or more memory devices. In one embodiment, the ROM bitcell array may be part of an integrated circuit design, wherein the integrated circuit includes a plurality of other components. When fabricated, the integrated circuit may be included in any of various types of devices (e.g., computing devices), apparatuses, and systems (e.g., computing systems, computers, servers, smartphones, tablets, watches).

The design tool may analyze the initial layout of the ROM bitcell array to determine if a first condition is detected for the ROM bitcell array (conditional block 1110). In one embodiment, the first condition may comprise determining the number of nets connected to the bitline is greater than the number of nets connected to ground for a given column of the ROM bitcell array. In this embodiment, the design tool may analyze each column of the ROM bitcell array to determine if the first condition is detected for any of the columns of the ROM bitcell array. In other embodiments, the first condition may comprise other factors.

If the first condition is detected for the ROM bitcell array (conditional block 1110, "yes" leg), then the design tool may perform a first optimization (block 1115). In one embodiment, the first optimization may comprise swapping connections between bitline and ground for the given column. Swapping connections between bitline and ground for the given column may comprise moving connections from a bitline to ground, and moving connections from ground to the bitline. It is noted that the first optimization may be performed for each column of the ROM bitcell array for which the first condition was detected. In other embodiments, the first optimization may comprise one or more other steps.

If the first condition is not detected for the ROM bitcell array (conditional block 1110, "no" leg), then the design tool may proceed to determine if a second condition is detected for the ROM bitcell array (conditional block 1120). In one embodiment, the second condition may comprise detecting three consecutive nets of a given column are connected to the bitline. In another embodiment, the second condition may comprise detecting that two nets at an end of a given column are connected to the bitline. In these embodiments, the design tool may analyze each column of the ROM bitcell array to determine if the second condition is detected for any of the columns of the ROM bitcell array. In other embodiments, the second condition may comprise other factors.

If the second condition is detected for the ROM bitcell array (conditional block 1120, "yes" leg), then the design tool may perform a second optimization (block 1125). In one embodiment, the second optimization may comprise removing at least one connection to the bitline for the three consecutive nets connected to the bitline of the given column. In another embodiment, the second optimization may comprise removing a connection to the bitline for a net at the end of the given column. In other embodiments, the second optimization may comprise one or more other steps. If the second condition is not detected for the ROM bitcell array (conditional block 1120, "no" leg), then method 1100 may end.

Figure 12:
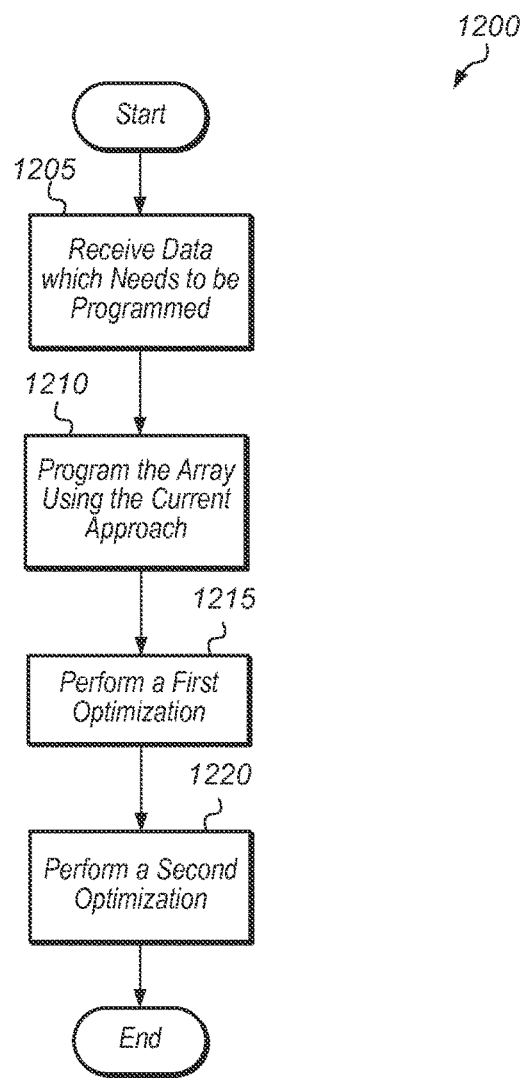
FIG. 12 is a generalized flow diagram illustrating one embodiment of a method for programming a ROM bitcell array.

Turning now to FIG. 12, one embodiment of a method 1200 for programming a ROM bitcell array is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the apparatuses and/or systems described herein may be configured to implement method 1200.

A design tool may receive data which is intended to be stored on a ROM bitcell array (block 1205). Any amount of data may be received, depending on the embodiment. Next, the design tool may program the array with the received data using a current approach (e.g., the approach of method 500 of FIG. 5) (block 1210). In other embodiments, other current approaches (e.g., the approach of method 1500 of FIG. 15) may be utilized to program the array in block 1210. Next, the design tool may perform a first optimization (block 1215). In one embodiment, the first optimization may be based on method 600 of FIG. 6. Next, the design tool may perform a second optimization on the programmed array (block 1220). In one embodiment, the second optimization may be based on method 700 of FIG. 7. After block 1220, method 1200 may end.

Figure 13:
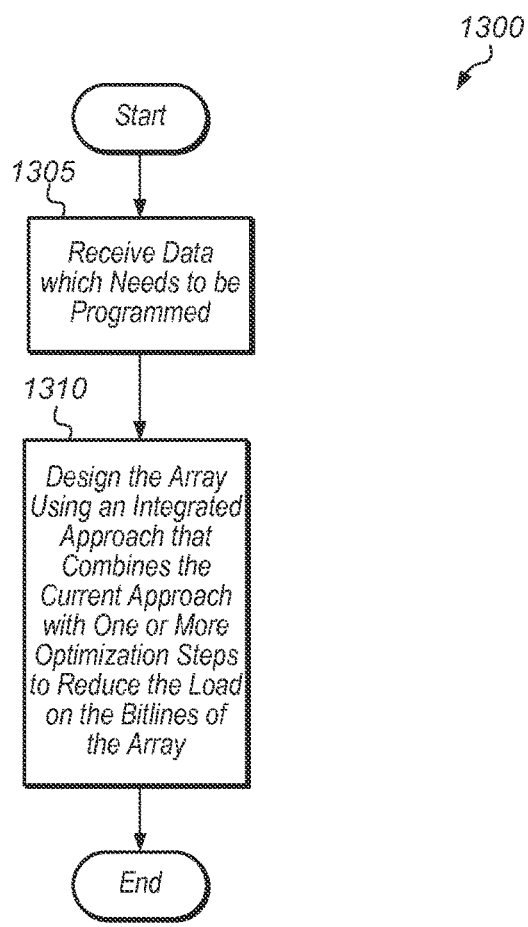
FIG. 13 is a generalized flow diagram illustrating another embodiment of a method for designing a ROM bitcell array.

Referring now to FIG. 13, another embodiment of a method 1300 for designing a ROM bitcell array is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the apparatuses and/or systems described herein may be configured to implement method 1300.

A design tool may receive data which is intended to be stored in a ROM bitcell array (block 1305). Next the design tool may design the array with the received data using an integrated approach that combines the current approach with one or more optimization steps to reduce the load on the bitlines of the array (block 1310). For example, in one embodiment, the design tool may combine the current approach with a first optimization step (e.g., method 600 of FIG. 6) and a second optimization step (e.g., method 700 of FIG. 7) in a single design stage for programming the array with the received data. After block 1310, method 1300 may end.

Figure 14:
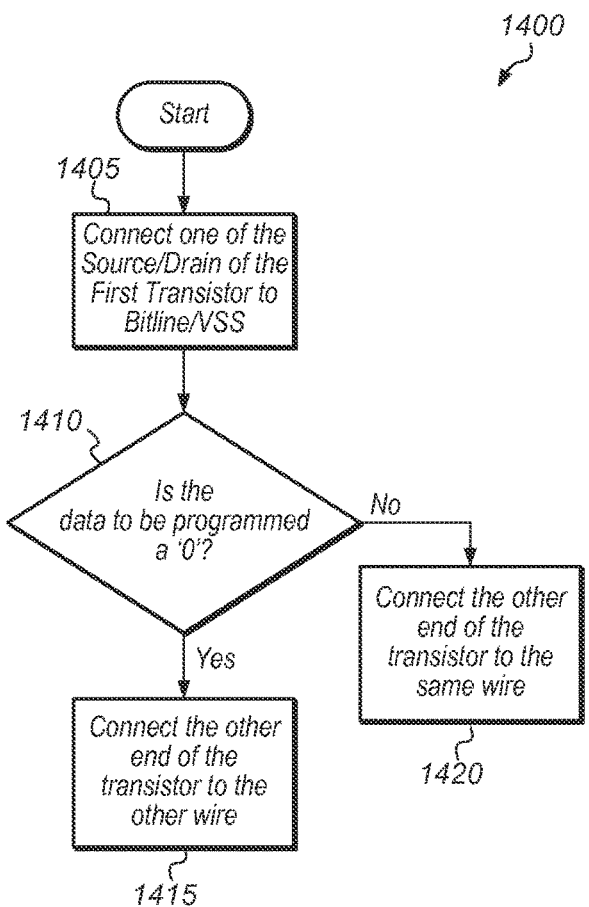
FIG. 14 is a generalized flow diagram illustrating one embodiment of a method for programming the first net of a bitcell array.

Turning now to FIG. 14, one embodiment of a method 1400 for programming the first net of a bitcell array is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the apparatuses and/or systems described herein may be configured to implement method 1400.

A design tool may connect the first net (either the source or the drain) of the first transistor to the bitline or VSS (block 1405). Depending on the embodiment, the design tool may choose to connect the first net to either of the bitline or VSS. For example, in one embodiment, the design tool may be configured to connect the first net to the bitline. In another embodiment, the design tool may be configured to connect the first net to VSS.

Next, the design tool may determine the data for programming the first transistor (conditional block 1410). If the data for programming the first transistor is a '0' (conditional block 1410, "yes" leg), then the design tool may connect the other end of the first transistor to the other wire (block 1415). Accordingly, if the first net of the first transistor was connected to the bitline in block 1405, then the other end of the first transistor may be connected to VSS in block 1415. If the first net of the first transistor was connected to VSS in block 1405, then the other end of the first transistor may be connected to the bitline in block 1415.

If the data for programming the first transistor is a '1' (conditional block 1410, "no" leg), then the design tool may connect the other end of the first transistor to the same wire (block 1420). Accordingly, if the first net of the first transistor was connected to the bitline in block 1405, then the other end of the first transistor may be connected to the bitline in block 1420. If the first net of the first transistor was connected to VSS in block 1405, then the other end of the first transistor may be connected to VSS in block 1420.

It is noted that method 1400 shows a variation on the current approach shown in method 500 of FIG. 5. The first net may be connected to the bitline or VSS, and then subsequent blocks may be altered depending on which choice was made for the first net. This is a different approach from block 545 of method 500 where the first net was connected to the bitline. It should be understood that different types of current approaches may be utilized with the optimizations described herein.

Figure 15:
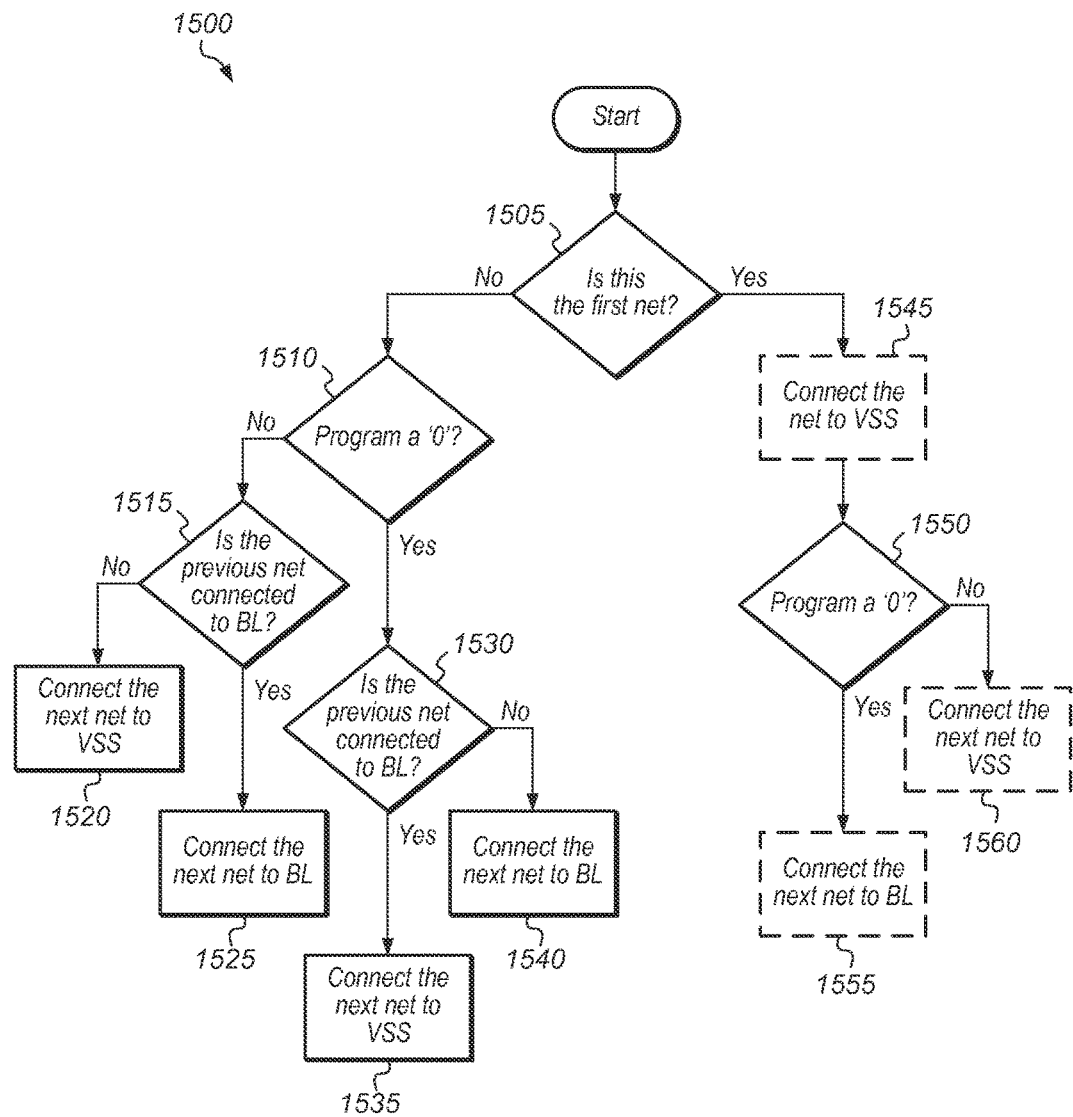
FIG. 15 is a generalized flow diagram illustrating another embodiment of a method for determining how to program a bitcell array.

Referring now to FIG. 15, another embodiment of a method 1500 for determining how to program a bitcell array is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, and/or systems described herein may be configured to implement method 1500.

Method 1500 is intended to represent a variation on the method 500 (of FIG. 5) for programming a bitcell array. The blocks of method 1500 that are different from method 500 are shown with a dashed border. These blocks are blocks 1545, 1555, and 1560. The other blocks of method 1500 may be performed in the same manner as their respective blocks in method 500. Accordingly, blocks 1505, 1510, 1515, 1520, 1525, 1530, 1535, 1540, and 1550 may be performed in the same manner as blocks 505, 510, 515, 520, 525, 530, 535, 540, and 550, respectively, of method 500.

In block 1545, the design tool may connect the net to VSS responsive to determining the net is the first net of the column in conditional block 1505. This is a different approach from method 500, wherein in block 545, the design tool connected the net to the bitline responsive to determining the net is the first net of the column in conditional block 505. In block 1555, the design tool may connect the next net to the bitline responsive to determining the bitcell is being programmed with a '0' in conditional block 1550. In block 1560, the design tool may connect the next net to VSS responsive to determining the bitcell is being programmed with a '1' in conditional block 1550.

It is noted that in some embodiments, methods 1200 (of FIG. 12) and 1300 (of FIG. 13) may utilize method 1500 as the current approach for programming the bitcell array in blocks 1210 and 1310, respectively. Then, after performing method 1500, one or more optimization steps may be performed to reduce the load on the bitlines of the bitcell array.

Figure 16:
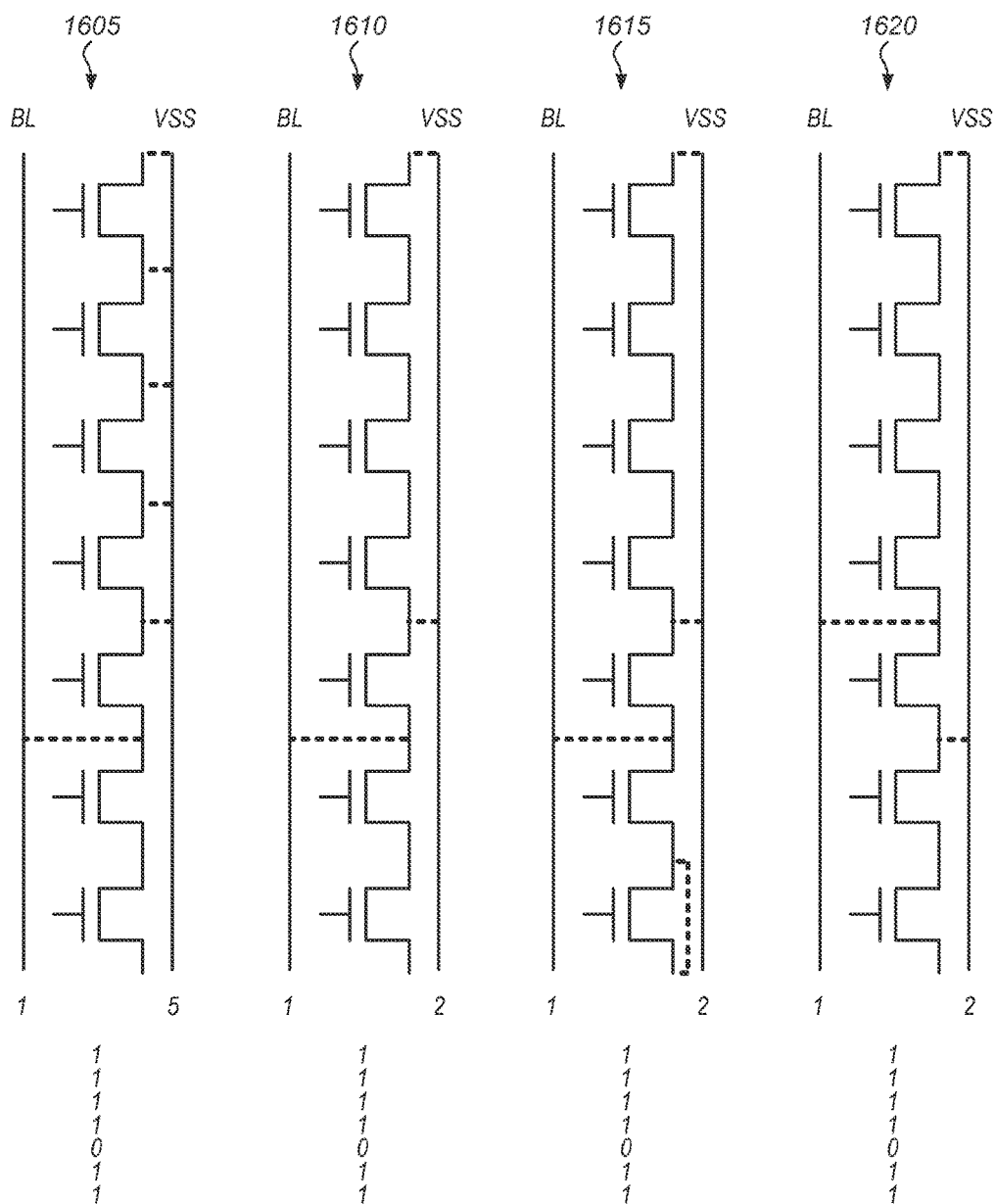
FIG. 16 illustrates diagrams of four columns storing the same data.

Turning now to FIG. 16, diagrams of four columns storing the same data are shown. After the second optimization has been performed, any of the bitcell connections shown in diagrams of 200 and 205 of FIG. 2 may be utilized to program a bitcell with a value of '0' to change one or more existing connections. Additionally, after the second optimization has been performed, any of the bitcell connections shown in diagrams of 300-325 of FIG. 3 may be utilized to program a bitcell with a value of '1' to change one or more existing connections. It should be understood that these value designations may be reversed in another embodiment, such that the bitcell connections of diagrams 200-205 may be utilized to program a bitcell with a value of '1' and the bitcell connections of diagrams 300-305 may be utilized to program a bitcell with a value of '0'.

Examples of different ways of programming a column of bitcells with the same data values using different connections are shown in FIG. 16. In column 1605, there is one net connected to the bitline and five nets connected to VSS to program the column with the values "1111011" as shown at the bottom of the column. Column 1610 illustrates a second way of programming a column with the values "1111011", with column 1610 having one net connected to the bitline and two nets connected to VSS. Column 1615 also has one net connected to the bitline and two nets connected to VSS, with the final two nets shorted to each other rather than left floating as in column 1610. The fifth bitcell of column 1620 has the VSS and the bitline connections reversed as compared to the fifth bitcell of column 1610. Otherwise, the other nets of column 1620 are connected in the same manner as the corresponding nets of column 1610.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus configured to optimize an array comprising a plurality of memory cells, wherein the apparatus is configured to:
   receive data comprising a netlist for use in fabricating the array;
   perform the steps, using a design tool:
      analyze the data comprising the netlist;
      determine for connected nets in a column of the array, a number of the connected nets that are connected to a bitline and a number of the connected nets that are connected to a ground;
      in response to detecting a first condition, wherein the first condition comprises determining that the number of connected nets connected to the bitline is greater than the number of connected nets connected to the ground, modify the data comprising the netlist to swap connections of the connected nets such that nets originally connected to the bitline are connected to the ground, and nets originally connected to the ground are connected to the bitline; and
   fabricate the array based on the data as modified.

2. The apparatus as recited in claim 1, wherein the apparatus is further configured to perform a second optimization in response to detecting a second condition, wherein the second condition comprises three consecutive nets of a given column are connected to a bitline, and wherein the second optimization comprises removing at least one of the three consecutive nets from the bitline.

3. The apparatus as recited in claim 2, wherein the second condition comprises two nets at a start or an end of a given column are connected to a corresponding bitline, and wherein the second optimization comprises removing a connection to the corresponding bitline for a net at the start or the end of the column.

4. The apparatus as recited in claim 2, wherein the second optimization is performed subsequent to the first optimization.

5. The apparatus as recited in claim 2, wherein the at least one connection is left floating after the at least one connection to the corresponding bitline is removed.

6. A method for optimizing an array comprising a plurality of memory cells, wherein the method comprises:
   receiving data comprising a netlist for use in fabricating the array;
   a design tool:
      analyzing the data comprising the netlist;
      determining for connected nets in a column of the array, a number of the connected nets that are connected to a bitline and a number of the connected nets that are connected to a ground;
      in response to detecting a first condition, wherein the first condition comprises determining that the number of connected nets connected to the bitline is greater than the number of connected nets connected to the ground, modifying the data comprising the netlist to swap connections of the connected nets such that nets originally connected to the bitline are connected to the ground, and nets originally connected to the ground are connected to the bitline; and fabricating the array based on the data as modified.

7. The method as recited in claim 6, further comprising performing a second optimization in response to detecting a second condition, wherein the second condition comprises three consecutive nets of a given column are connected to a bitline, and wherein the second optimization comprises removing at least one of the three consecutive nets from the bitline.

8. The method as recited in claim 7, wherein the second condition comprises two nets at a start or an end of a given column are connected to a corresponding bitline, and wherein the second optimization comprises removing a connection to the corresponding bitline for a net at the start or the end of the column.

9. The method as recited in claim 7, wherein the second optimization is performed subsequent to the first optimization.

10. The method as recited in claim 7, wherein the at least one connection is left floating after the at least one connection to the corresponding bitline is removed.

11. A computing system comprising:

a memory storing program instructions; and one or more processors configured to execute the program instructions, wherein the program instructions are executable to:

receive data comprising a netlist for use in fabricating an array;

analyze the data comprising the netlist;

determine for connected nets in a column of the array, a number of the connected nets that are connected to a bitline and a number of the connected nets that are connected to a ground;

in response to detecting a first condition, wherein the first condition comprises determining that the number of the connected nets connected to the bitline is greater than the number of the connected nets connected to the ground, modify the data comprising the netlist to swap connections of the connected nets such that nets originally connected to the bitline are connected to the ground, and nets originally connected to the ground are connected to the bitline; and fabricate the array based on the data as modified.

12. The computing system as recited in claim 11, further comprising performing a second optimization in response to detecting a second condition, wherein the second condition comprises three consecutive nets of a given column are connected to a bitline, and wherein the second optimization comprises removing at least one of the three consecutive nets from the bitline.

13. The computing system as recited in claim 12, wherein the second condition comprises two nets at a start or an end of a given column are connected to a corresponding bitline, and wherein the second optimization comprises removing a connection to the corresponding bitline for a net at the start or the end of the column.

14. The computing system as recited in claim 12, wherein the second optimization is performed subsequent to the first optimization.

15. The computing system as recited in claim 12, wherein the at least one connection is left floating after the at least one connection to the corresponding bitline is removed.

* * * * *